(12) United States Patent
Venkatachalam et al.

(10) Patent No.: US 9,143,253 B2
(45) Date of Patent: Sep. 22, 2015

(54) TECHNIQUES FOR DELIVERING EMERGENCY PAYLOADS FOR NON-VOICE EMERGENCY SERVICES

(71) Applicant: Intel Corporation, Santa Clara, CA (US)

(72) Inventors: Muthaiah Venkatachalam, Beaverton, OR (US); Eric Siow, Beaverton, OR (US); Puneet K. Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 104 days.

(21) Appl. No.: 13/828,973

(22) Filed: Mar. 14, 2013

(65) Prior Publication Data

US 2013/0303104 A1 Nov. 14, 2013

Related U.S. Application Data

(60) Provisional application No. 61/646,223, filed on May 11, 2012.

(51) Int. Cl.
*H04M 11/04* (2006.01)
*H04W 4/00* (2009.01)
(Continued)

(52) U.S. Cl.
CPC ................ *H04J 3/1694* (2013.01); *H04B 1/56* (2013.01); *H04B 7/024* (2013.01); *H04B 7/0456* (2013.01); *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01);
(Continued)

(58) Field of Classification Search
None
See application file for complete search history.

(56) References Cited

U.S. PATENT DOCUMENTS 5,937,355 A * 8/1999 Joong et al. .................... 455/466
8,781,438 B2 * 7/2014 Siow et al. ................. 455/404.1
(Continued)

*Primary Examiner* — Erika A Washington
(74) *Attorney, Agent, or Firm* — Kacvinsky Daisak Bluni PLLC

(57) ABSTRACT

Examples are disclosed for delivering, at user equipment (UE) such as a wireless device, emergency payloads for non-voice emergency services (NOVES). The examples include receiving, at a UE, an emergency payload associated with a NOVES that may include an emergency indicator, a voice message, a video or a text message. An attempt may be made to deliver the emergency payload to a public service answering point (PSAP) and if the attempt is not successful, the emergency payload may be stored at the UE. A number of reattempts may be made to deliver the emergency payload to the PSAP if the attempt is not successful. Based on an acknowledgement of delivery of the emergency payload to the PSAP or aborting reattempts to deliver the emergency payload, the stored emergency payload may be removed from the UE. Other examples are described and claimed.

26 Claims, 8 Drawing Sheets

(51) Int. Cl.

| | |
|---|---|
| *H04J 3/16* | (2006.01) |
| *H04B 7/26* | (2006.01) |
| *H04W 24/10* | (2009.01) |
| *H04W 72/04* | (2009.01) |
| *H04W 72/08* | (2009.01) |
| *H04W 36/00* | (2009.01) |
| *H04J 3/00* | (2006.01) |
| *H04B 1/56* | (2006.01) |
| *H04W 56/00* | (2009.01) |
| *H04W 52/02* | (2009.01) |
| *H04W 76/02* | (2009.01) |
| *H04W 4/22* | (2009.01) |
| *H04W 36/22* | (2009.01) |
| *H04B 15/00* | (2006.01) |
| *H04W 76/04* | (2009.01) |
| *H04B 7/02* | (2006.01) |
| *H04B 7/04* | (2006.01) |
| *H04B 7/06* | (2006.01) |
| *H04W 24/02* | (2009.01) |
| *H04W 72/12* | (2009.01) |
| *H04L 29/02* | (2006.01) |
| *H04W 4/06* | (2009.01) |
| *H04W 48/20* | (2009.01) |
| *H04L 29/06* | (2006.01) |
| *H04W 4/02* | (2009.01) |
| *H04J 3/26* | (2006.01) |
| *H04L 27/26* | (2006.01) |
| *H04W 72/10* | (2009.01) |
| *H04W 88/06* | (2009.01) |
| *H04W 72/02* | (2009.01) |
| *H04W 16/14* | (2009.01) |

(52) U.S. Cl.
CPC .......... *H04W76/023* (2013.01); *H04W 76/027* (2013.01); *H04W 76/048* (2013.01); *H04W 16/14* (2013.01); *H04W 72/02* (2013.01); *H04W 88/06* (2013.01); *Y02B 60/50* (2013.01)

(56) References Cited

U.S. PATENT DOCUMENTS

| | | | |
|---|---|---|---|
| 2004/0048629 A1* | 3/2004 | Yoon | 455/466 |
| 2009/0197622 A1* | 8/2009 | Atarius | 455/466 |
| 2011/0189971 A1* | 8/2011 | Faccin et al. | 455/404.1 |

* cited by examiner

500

RECEIVE AN EMERGENCY PAYLOAD ASSOCIATED WITH A NOVES, THE EMERGENCY PAYLOAD TO INCLUDE AT LEAST ONE OF AN EMERGENCY INDICATOR, A VOICE MESSAGE, A VIDEO OR A TEXT MESSAGE
502

ATTEMPT TO INITIATE AN EMERGENCY SESSION AS PART OF AN EMM OR ESM PROCEDURE WITH A MME, THE EMERGENCY SESSION INITIATED TO DELIVER THE EMERGENCY PAYLOAD TO A PSAP
504

STORE THE EMERGENCY PAYLOAD AT A UE RESPONSIVE TO A FAILURE TO INITIATE THE EMERGENCY SESSION
506

REATTEMPT TO INITIATE THE EMERGENCY SESSION TO DELIVER THE EMERGENCY PAYLOAD TO THE PSAP

ABORT ATTEMPTS TO INITIATE THE EMERGENCY SESSION BASED ON A NUMBER OF REATTEMPTS EXCEEDING A SET NUMBER OF REATTEMPTS
510

REMOVE THE EMERGENCY PAYLOAD FROM THE UE
512

508

RECEIVE AN ACKNOWLEDGEMENT OF DELIVERY OF THE EMERGENCY PAYLOAD TO THE PSAP FOLLOWING A SUCCESSFUL ATTEMPT TO INITIATE THE EMERGENCY SESSION, THE EMERGENCY PAYLOAD REMOVED FROM THE UE BASED ON RECEIVING THE ACKNOWLEDGEMENT
514

*FIG. 5*

Storage Medium 600

*Computer Executable Instructions for 500*

*FIG. 6*

TECHNIQUES FOR DELIVERING EMERGENCY PAYLOADS FOR NON-VOICE EMERGENCY SERVICES

RELATED CASE

This application claims priority to U.S. Provisional Patent Application No. 61/646,223, filed on May 11, 2012.

TECHNICAL FIELD

Examples described herein are generally related to wireless communication devices.

BACKGROUND

Traditionally, emergency situations have been communicated via voice-based calling services such as those associated with a caller dialing 9-1-1 to communicate an emergency. These voice-based calling services were built on the assumption of fixed location phones having landlines and including capabilities that enabled little more than merely placing a voice-based call. Wireless phones have evolved to become a predominate mode of communication and most wireless phones also have non-voice capabilities to include text messaging, capturing video or other means to communicate an emergency situations. Industry organizations and regulatory bodies are currently working together to develop non-voice emergency service (NOVES) guidelines and/or standards to utilize non-voice capabilities of wireless phones to communicate emergency situations and allow local emergency response providers to better respond.

BRIEF DESCRIPTION OF THE DRAWINGS

FIG. 5 illustrates an example of a logic flow.
FIG. 6 illustrates an example of a storage medium.

DETAILED DESCRIPTION

Figure 1:
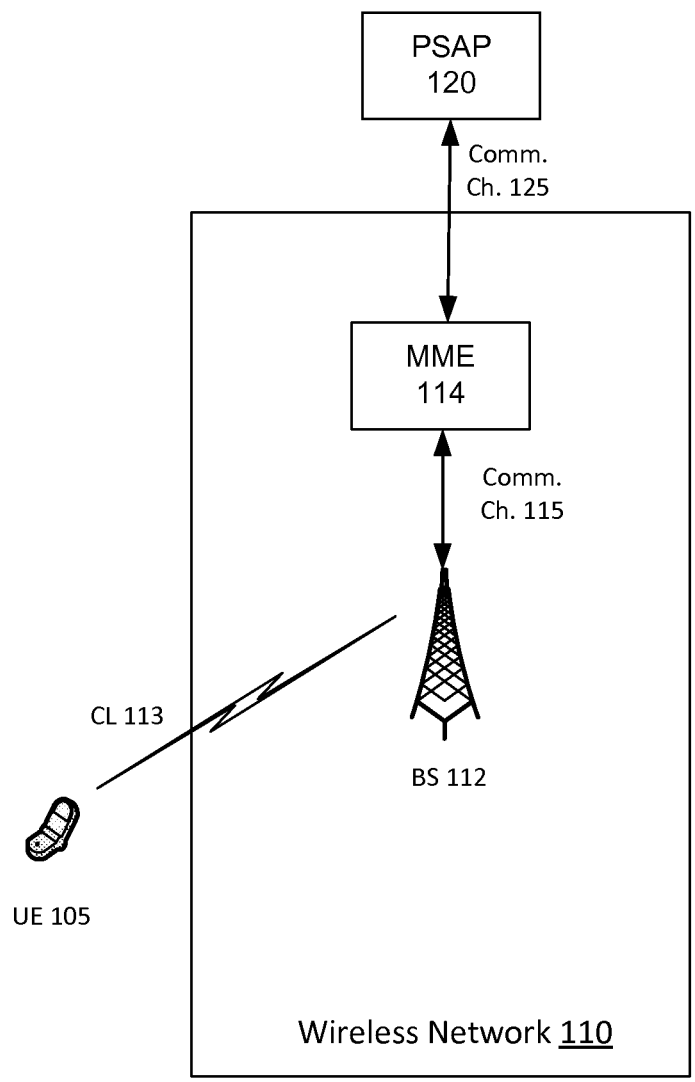
FIG. 1 illustrates an example first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, industry organizations such as 3GPP and regulatory bodies such as the United States Federal Communications Commission (FCC) are currently working together to develop non-voice emergency service (NOVES) guidelines and/or standards to utilize non-voice capabilities of wireless phones to communicate emergency situations. One 3GPP effort is described in technical report (TR) 3GPP TR 22.871, v11.3.0, "3GPP; Technical Specification Group Services and System Aspects; Study on Non-Voice Emergency Services (Release 11)", published September 2011. Efforts in the United States between 3GPP and the FCC are expected to be in the forefront of the use of NOVES to communicate emergency situations via a wireless device or a UE coupled to a wireless network operated in compliance with one or more 3GPP LTE standards that may include LTE-A.

In some situations, a user of a wireless device or UE may be in an emergency situation and thus may invoke NOVES using the UE. For these situations, a wireless connection to a wireless network may fail and thus an emergency communication does not reach a public service answering point (PSAP) due to the connection failure. Connection failure may be due to a weak or spotty signal quality from base stations or evolved Node Bs (eNBs) for a wireless network connection. Connection failure may also be due to network congestion or even the network being down. Any of these connection failures may be particularly problematic for someone such as a heart attack victim who may not be able to continually try to reattempt to invoke NOVES as that person may quickly become fully incapacitated or unable to make further manual reattempts. It is with respect to these and other challenges that the examples described herein are needed.

In some examples, techniques are implemented for receiving, at a UE capable of operating in compliance with one or more 3GPP LTE standards that may include LTE-A, an emergency payload associated with a NOVES. For these examples, the emergency payload may include an emergency indicator, a voice message, a video or a text message. Attempts may be made to transmit the emergency payload to a PSAP via a wireless communication network. Responsive to an unsuccessful attempt to transmit the emergency payload to the PSAP the emergency payload may be stored at the UE. One or more reattempts may be made to transmit the emergency payload until a successful attempt to transmit the emergency payload has occurred or the NOVES has been aborted. According to some examples, the emergency payload may be purged or removed from the UE responsive to an acknowledgement from the PSAP of receipt of the emergency payload. In some other examples, the emergency payload may be purged or removed from the UE responsive to the NOVES being aborted.

FIG. 1 illustrates an example of a first system. As shown in FIG. 1, the first system includes system 100. In some examples, as shown in FIG. 1, system 100 includes user equipment (UE) 105 coupled to a wireless network 110 via a wireless communication link (CL) 113 with base station (BS) 112. For these examples, BS 112 may be an eNB and serve as an access point to wireless network 110 configured to operate in compliance with one or more 3GPP LTE standards to include LTE-A. BS 113 may be capable of forwarding communications received from UE 105 to a mobility management entity (MME) 114 via communication channel (Comm. Ch.) 115. MME 114 may be configured to manage access to wireless network 110 and may also be capable of forwarding emergency information routed through wireless network 110 to a Public Service Answering Point (PSAP) 120 via Comm. Ch. 125.

According to some examples, a user of UE 105 may invoke a NOVES due to an emergency situation. Logic and/or features of UE 105 may be capable of generating an emergency payload associated with the NOVES. The emergency payload may include, but is not limited to, an emergency indicator, a voice message, a video or a text message. In some examples, these types of emergency payloads may be pre-configured so that a user of UE 105 can just press one or more buttons, touch a display icon or make a verbal command to cause UE 105 to attempt to transmit the emergency payload. For example, a pre-recorded voice message or video message could be sent as part of the emergency payload. Also, a pre-written or pre-typed text message could also be sent with the emergency payload. UE 105 may also include logic and/or features to include other information with the emergency payload to include location information (e.g., GPS, grid or map coordinates) or a timestamp corresponding to the time the NOVES was invoked.

In some examples, the emergency indicator possibly included in an emergency payload may be situation dependent. For these examples, the emergency indicator may indicate the particular situation. Examples may include, but are not limited to, the user may be located in a residence and an intruder may have broken in to the residence. In other examples, the user may have been in or observed a vehicle accident, may be experiencing a medical emergency (e.g., fall accident, heart attack, stroke or allergic reaction) or may be witnessing a burglary or actually being burglarized. In yet more examples, the user may be physically lost (e.g., in a wilderness area) or may be in the process of being abducted or kidnapped or witness someone else being abducted or kidnapped. Also, workplace violence alert may indicate a situation where a user is threatened by a co-worker to include a co-worker with a knife, gun or other type of deadly weapon.

According to some examples, UE 105 may attempt to transmit the emergency payload to a PSAP via wireless network 110. For these examples, MME 114 may be capable of identifying that the emergency payload received from UE 105 is associated with a NOVES and then may determine that PSAP 120 should receive the emergency payload from UE 105. MME 114 may make the determination based on PSAP 120's physical proximity to UE 105. For example, UE 105 may indicate its location is near Portland, Oreg. Therefore, MME 114 may choose PSAP 120 due to its physical location near Portland, Oreg. or due to PSAP 120 providing emergency contact services for the area in or around Portland, Oreg.

As described more below, UE 105 may include logic and/or features to handle the emergency payload associated with the NOVES. The logic and/or features may be implemented at various layers to include an application layer to execute an emergency call handling application (ECHA) capable of receiving the emergency payload associated with the NOVES and attempting to attach to wireless network 110 to transmit the emergency payload to PSAP 120 via wireless network 110. In some examples, BS 112 and/or MME 114 may serve as or be associated with an emergency access point name (APN) for ECHA to attach to wireless network 110. The ECHA may also be capable of storing the emergency payload responsive to an unsuccessful attempt to attach. The ECHA may also be capable of reattempting to transmit the stored emergency payload on at least a periodic basis. The ECHA may also be capable of possibly purging the emergency payload from the UE responsive to receiving an acknowledgement from PSAP 120 or responsive to the NOVES being aborted.

In some examples, the logic and/or features to handle the emergency payload may be implemented at a non-access stratum (NAS) layer of a 3GPP protocol stack executed by a processor circuit of UE 105. For these examples, the NAS layer may be capable of receiving the emergency payload associated with the NOVES and attempt to transmit the emergency payload to PSAP 120 via wireless network 110. The NAS layer may also be capable of storing the emergency payload responsive to an unsuccessful attempt. The NAS layer may also be capable of reattempting to transmit the stored emergency payload on at least a periodic basis. The NAS layer may also be capable of possibly purging the emergency payload from the UE responsive to receiving an acknowledgement from PSAP 120 or responsive to the NOVES being aborted.

According to some examples, the logic and/or features to handle the emergency payload may be implemented at a radio resource control (RRC) layer of a 3GPP protocol stack executed by a processor circuit of UE 105. For these examples, the RRC layer may be capable of receiving the emergency payload associated with the NOVES and attempt to transmit the emergency payload to PSAP 120 via wireless network 110. The RRC layer may also be capable of storing the emergency payload responsive to an unsuccessful attempt. The RRC layer may also be capable of reattempting to transmit the stored emergency payload on at least a periodic basis. The RRC layer may also be capable of possibly purging the emergency payload from the UE responsive to receiving an acknowledgement from PSAP 120 or responsive to the NOVES being aborted.

In some examples, the logic and/or features to handle the emergency payload may be implemented at an emergency store and forward (ESF) layer of a 3GPP protocol stack executed by a processor circuit of UE 105. For these examples, the ESF layer may be a specially designed, task specific layer capable of receiving the emergency payload associated with the NOVES and attempt to transmit the emergency payload to PSAP 120 via wireless network 110. The ESF layer may also be capable of storing the emergency payload responsive to an unsuccessful attempt. The ESF layer may also be capable of reattempting to transmit the stored emergency payload on at least a periodic basis. The ESF layer may also be capable of possibly purging the emergency payload from the UE responsive to receiving an acknowledgement from PSAP 120 or responsive to the NOVES being aborted.

According to some examples, UE 105 may be any electronic device having wireless capabilities or equipment. For some examples, UE 105 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at BS 112 may include system equipment, such as network equipment for a communications system or network compliant with one or more 3GPP LTE Specifications (e.g., LTE-A). For example, these base stations may be implemented as evolved Node B (eNB) base stations for a Wireless LTE or LTE-A network. Although some examples are described with reference to a base station or eNB, embodiments may utilize any network equipment for a wireless network. The examples are not limited in this context.

In some examples, Comm. Chs. 115 or 125 may be arranged or configured as communication channels separately including one or more communication links via which BS 112, MME 114 or PSAP 120 may exchange information. These one or more communication links may include various types of wired, wireless or optical communication mediums. For these examples, the communication links may be operated in accordance with one or more applicable communication or networking standards in any version.

Figure 2:
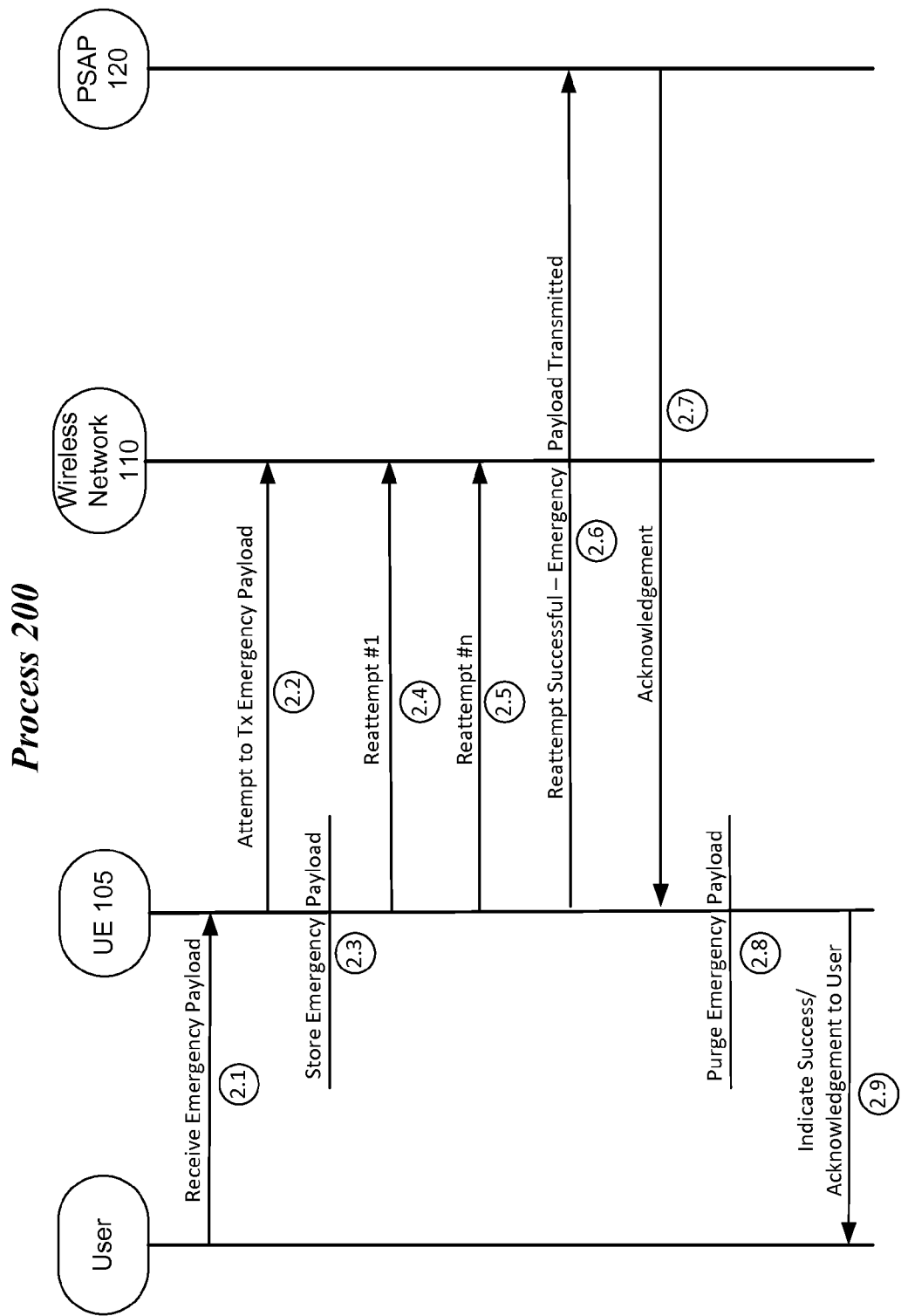
FIG. 2 illustrates an example process.

FIG. 2 illustrates an example process 200. In some examples, process 200 may be for delivering an emergency payload associated with a NOVES invoked by a user of a UE. For these examples, elements of wireless network 100 as shown in FIG. 1 may be used to illustrate example operations related to process 200. The described example operations are not limited to implementations on wireless network 200.

Beginning at process 2.1 (Receive Emergency Payload), a user may invoke NOVES due to an emergency situation (e.g., a heart attack) and an emergency payload may be received by logic and/or features of UE 105. According to some examples, the emergency payload may include an emergency indicator, a voice message, a video or a text message that may have been created by or caused to be created by the user and received by the logic and/or features of UE 105.

Proceeding to process 2.2 (Attempt to Tx Emergency Payload), the logic and/or features of UE 105 may attempt to transmit the emergency payload to PSAP 120 via wireless network 110. In some examples, UE 105 may attempt to couple to wireless network 110 through BS 112.

Proceeding to process 2.3 (Store Emergency Payload), the logic and/or features of UE 105 may capable of storing the emergency payload at UE 105 (e.g., in a store and forward buffer) responsive to an unsuccessful attempt to transmit the emergency payload to PSAP 120. In some examples, the unsuccessful attempt may have been caused by such events that include, but are not limited to, an inadequate communication link between UE 105 and BS 112 to transmit the emergency payload or even to attach to wireless network 110. Other causes may include wireless network 110 being congested such that even if an adequate communication link was established with BS 112, congestion at network elements such as at MME 114 may cause an unsuccessful attempt to transmit and/or deliver the emergency payload to PSAP 120. Also, network 112 may be temporarily inoperable due to a storm event (e.g., a hurricane), natural disaster (e.g., earthquake) or power outage that may have temporarily disabled network 112.

Proceeding to process 2.4 (Reattempt #1), the logic and/or features of UE 105 may reattempt transmission of the emergency payload. According to some examples, the emergency payload that was previously stored at UE 105 may be retrieved by the logic and/or features and another attempt made to transmit the emergency payload to PSAP 120 via wireless network 110.

Proceeding to process 2.5 (Reattempt #n), logic and/or features at UE 105 may reattempt to transmit the emergency payload to PSAP 120 via wireless network 110. In some examples, the logic and/or features may reattempt to transmit the emergency payload for a configurable or set number of n times, where n equates to any positive integer. For these examples, n may be pre-configured by the user of UE 105 or may be pre-configured based on the type of emergency associated with an invoked NOVES. Also, in addition to a pre-configured value for n, the time interval between each successive attempt may be pre-configured. The pre-configured value for n and the time interval may balance power saving efforts with attempts to send the emergency payload. In some examples, the value for n and/or the time intervals may be adaptively changed based on an algorithm that reduces the value for n and/or shortens/lengthens time intervals based on available battery power for UE 105. So in other words, if the battery power is running low, less reattempts and/or less frequent reattempts may be made by the logic and/or features of UE 105. Conversely, if the battery power is at a high level or UE 105 is connected to a power source, more reattempts at a higher frequency may be made.

Proceeding to process 2.6 (Reattempt Successful—Emergency Payload Transmitted), UE 105 may have successfully transmitted the emergency payload to PSAP 120 via wireless network 120. According to some examples, UE 105 may have been able to attach to wireless network 110 either after a first attempt or after n attempts.

Proceeding to process 2.7 (Acknowledgement), UE 105 may receive an acknowledgement from PSAP 120 of receipt of the emergency payload. In some examples, as shown in FIG. 2, the acknowledgement may be routed back through wireless network 110 to UE 105.

Proceeding to process 2.8 (Purge Emergency Payload), logic and/or features of UE 105 may be capable of purging the emergency payload from UE 105. According to some examples, the emergency payload may be purged, erased or removed from UE 105 responsive to receipt of the acknowledgement from PSAP 120. Although not shown in FIG. 2, in some other examples, the logic and/or features of UE 105 may also be capable of purging the emergency payload from UE 105 based on the number of reattempts exceeding the value for n or based on the user aborting the invoked NOVES.

Proceeding to process 2.9 (Indicate Success/Acknowledgement to User), logic and/or features of UE 105 may be capable of providing an indication of the successful transmitting or delivery of the emergency payload to PSAP 120. In some examples, the indication may be displayed on a display screen for UE 105 that visually depicts a successful transmission and may also include any instructions received from the PSAP 120 that may have accompanied the acknowledgement.

Figure 3:
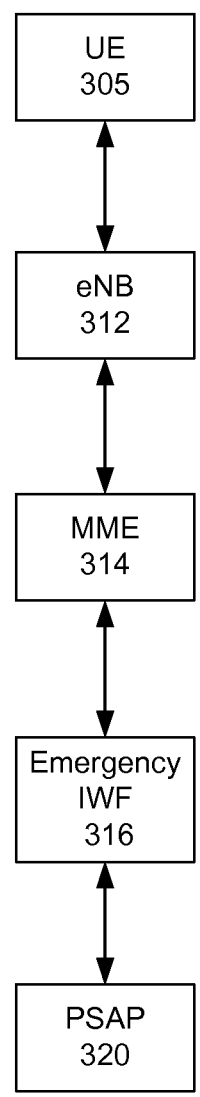
FIG. 3 illustrates an example second system.

FIG. 3 illustrates an example second system. As shown in FIG. 3, the example second system includes system 300. According to some examples, a process similar to process 200 described above for FIG. 2 may be implemented at a NAS layer of a 3GPP protocol stack executed by a processor circuit for a UE shown in FIG. 3 as UE 305. For these examples, the NAS layer of UE 305 may be configured to operate in compliance with one or more 3GPP standards to include LTE-A.

In some examples, the NAS layer may attempt to initiate an emergency session associated with delivering an emergency payload received in association with a NOVES invoked by a user of UE 305. For these examples, the emergency payload may be routed through a wireless network that includes eNB 312, MME 314 or emergency interworking function (IWF) 316 to a destination PSAP such as PSAP 320. Also, for these examples, the emergency session may not require authentication and integrity protection. Therefore UE 305 may attempt to initiate the emergency session as part of an evolved packet system (EPS) mobility management (EMM) procedure with a mobility management entity such as MME 314.

According to some examples for the EMM procedure, logic and/or features of UE 305 may be capable of delivering the emergency payload via an emergency attach to MME 314 through a wireless communication channel with eNB 312. MME 314 may use emergency IWF 316 to facilitate the delivery of the emergency payload to PSAP 320. This use may include possible protocol translations associated with moving the emergency payload from a wireless network to PSAP 320.

In some examples where attempts to initiate the emergency session fail, logic and/or features at UE 305 may at least temporarily store the emergency payload in a memory structure that maintains an EMM context table. A timestamp to indicate a time when the NOVES was invoked may also be stored with the emergency payload in the EMM context table. Subsequent reattempts to initialize the emergency session may be made to deliver this emergency payload and its timestamp to PSAP 320. According to some examples, upon either aborting attempts to initiate the emergency session or based on successfully initiating the emergency session and delivering the emergency payload, the stored emergency payload may be removed, erased or purged from the EMM context table.

In some examples, the NAS layer may attempt to initiate an emergency session that does require integrity protection. For these examples, logic and/or features of UE 305 may be capable of attempting to initiate the emergency session as part of an EPS session management (ESM) procedure. According to some examples for the ESM procedure, logic and/or features of UE 305 may be capable of delivering the emergency payload via use of one or more uplink Generic NAS transport messages routed over a wireless communication channel with eNB 312 and through MME 314 to emergency IWF 316. Similar what was mentioned above for the EMM procedure, MME 314 may use emergency IWF 316 to facilitate the delivery of the emergency payload to PSAP 320. This use may include possible protocol translations associated with the uplink Generic NAS transport messages used to deliver the emergency payload to PSAP 320.

In some examples where attempts to initiate the emergency session fail, logic and/or features at UE 305 may at least temporarily store the emergency payload in a memory structure that maintains an ESM context table. A timestamp to indicate a time when the NOVES was invoked may also be stored with the emergency payload in the ESM context table. Similar to the EMM procedure, subsequent reattempts to initialize the emergency session may be made to deliver this emergency payload and its timestamp to PSAP 320. According to some examples, upon either aborting attempts to initiate the emergency session or based on successfully initiating the emergency session to deliver the emergency payload, the stored emergency payload may be removed, erased or purged from the ESM context table.

According to some examples, emergency IWF 316 may be used to also translate message received from PSAP 320 to protocols used by the wireless network that includes MME 314 and eNB 312 to enable acknowledgements of receipt of the emergency payload to be received by UE 305. For example, using the ESM procedure that includes uplink generic NAS transport messages, emergency IWF 316 may receive an acknowledgement of delivery of the emergency payload from PSAP 320 and then forward the acknowledgement to MME 314. For this example, either emergency IWF 316 or MME 314 may then use one or more downlink generic NAS transport messages to cause the acknowledgement to UE 305 to be delivered to UE 305 over a communication link with eNB 312.

In some examples, emergency IWF 316 may act as a service center towards PSAP 320. In some deployment scenarios MME 314 and emergency IWF 316 may be co-located. In other deployments IWF 316 may be located with PSAP 320. In either deployment, emergency IWF 316 may serve as an intermediary that delivers an emergency payload from UE 305 to PSAP 320 or forwards acknowledgements to UE 305 from PSAP 320 that may indicate receipt of the emergency payload by PSAP 320.

Figure 4:
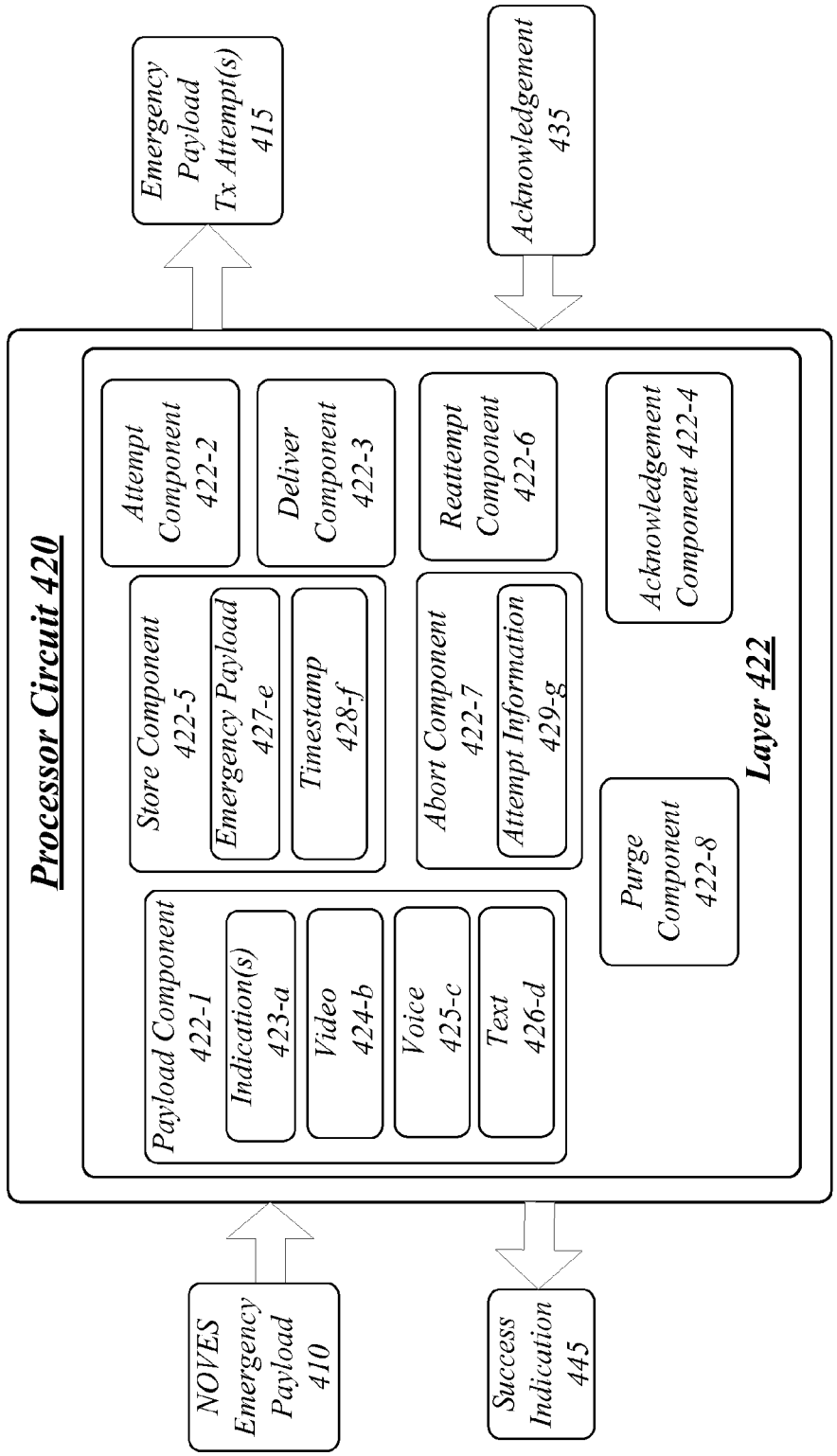
FIG. 4 illustrates an example block diagram for an apparatus.

FIG. 4 illustrates an example block diagram for an apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may comprise a computer-implemented apparatus 400 having a processor circuit 420 arranged to execute layer 422. Layer 422 may include an application layer or may include various layers of a 3GPP protocol stack such as a NAS layer, an RRC layer or an ESF layer. Layer 422 may further be arranged to implement one or more software components 422-*a*. It is worthy to note that "a" and "b" and "c" and similar designators as used herein are intended to be variables representing any positive integer. Thus, for example, if an implementation sets a value for a=8, then a complete set of software components 422-*a* may include components 422-1 through 422-8. The examples are not limited in this context.

According to some examples, apparatus 400 may be user equipment (e.g., located at or with UE 105/305), capable of operating in compliance with one or more 3GPP LTE Specifications. For example, apparatus 400 may be capable of communicatively coupling to an LTE and/or LTE-A compliant wireless network via one or more eNBs. The examples are not limited in this context.

In some examples, as shown in FIG. 4, apparatus 400 includes processor circuit 420. Processor circuit 420 may be generally arranged to execute layer 422. The processing circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 420.

According to some examples, apparatus 400 may include a payload component 422-1. Payload component 422-1 may be capable of receiving NOVES emergency payload 410. For these examples, a NOVES may be invoked by a user of a UE that includes apparatus 400. NOVES emergency payload 410 may include one of an emergency indicator, a voice message, a video or a text message. In some examples, payload component 422-1 may at least temporarily store these types of emergency payloads as indication(s) 423-$a$, video 424-$b$, voice 425-$c$ or text 426-$d$ in a data structure such as a lookup table (LUT) maintained at the UE.

In some examples, indication(s) 423-$a$, video 424-$b$, voice 425-$c$ or text 426-$d$ may include pre-configured or pre-recorded content that may be added to or replace NOVE emergency payload 410. For example a user that invoked the NOVES by pressing a button or key, touching a display icon or voicing a verbal command. Pressing the button or key, touching the display icon or voicing the verbal command may initiate creation of NOVES emergency payload 410 and payload component 422-1 may then add the pre-configured content upon receipt of NOVES emergency payload 410.

In some examples, apparatus 400 may also include an attempt component 422-2. Attempt component 422-2 may be capable of initiating an emergency session. For these examples, the attempt to initiate the emergency session may be part of an EMM or ESM procedure with an MME. The initiation of the emergency session may be include emergency payload Tx attempt(s) 415 that may attempt to deliver NOVES emergency payload 410 to a PSAP.

In some examples, apparatus 400 may also include a deliver component 422-3. Deliver component 422-3 may be capable of delivering NOVES emergency payload 410 dependent on whether the EMM or the ESM procedure is implemented by attempt component 422-2. For examples where the EMM procedure is implemented, deliver component 422-3 may deliver NOVES emergency payload 410 upon initiation of the emergency session via an emergency attach to the MME. For examples where the ESM procedure is implemented, deliver component 422-3 may deliver NOVES emergency payload 410 upon initiation of the emergency via one or more uplink generic NAS transport messages routed through the MME.

According to some examples, apparatus 400 may also include an acknowledgement component 422-4. Acknowledgement component 422-4 may be capable of receiving acknowledgement 435 that may be an acknowledgement of delivery of NOVES emergency payload 410 to the PSAP following a successful attempt to initiate the emergency session. Acknowledgement component 422-4, in some examples, may cause success indication 445 to be provided to the user that invoked the NOVES. Success indication 445 may include a visual indication of the successful delivery of the emergency payload and/or may include further instructions that may have been relayed with the acknowledgement.

In some examples, apparatus 400 may also include a store component 422-5. Store component 422-5 may be capable of storing an emergency payload 427-$e$ included in or associated with NOVES emergency payload 410 responsive to a failure to initiate the emergency session by attempt component 422-2. In examples were the EMM procedure is implemented by attempt component 422-2, emergency payload 427-$e$ may be stored by store component 422-4 in an EMM context table maintained in a memory at the UE that includes apparatus 400. In examples where the ESM procedure is implemented by attempt component 422-2, emergency payload 427-$e$ may be stored by store component 422-4 in an ESM context table in a memory at the UE that includes apparatus 400. In some examples, emergency payload 427-$e$ may be also be stored with a timestamp 428-$f$ to indicate a time when the NOVES was invoked to indicate the emergency.

According to some examples, apparatus 400 may also include a reattempt component 422-6. Reattempt component 422-6 may be capable of reattempting to initiate the emergency session to enable delivery component 422-3 to deliver NOVES emergency payload 410 to the PSAP. Reattempt component 422-6 may obtain the emergency payload for NOVES emergency payload 410 from emergency payload 427-$e$. Reattempt component 422-6 may also obtain the associated timestamp from timestamp 428-$f$. The obtained emergency payload and associated timestamp may then be included in emergency payload Tx attempt(s) 415 that may further attempt to deliver NOVES emergency payload 410 to the PSAP.

In some examples, apparatus 400 may also include an abort component 422-7. Abort component 422-7 may be capable of causing reattempt component 422-6 to abort reattempts to initiate the emergency session based on a number of reattempts exceeding a set number of reattempts. The set number may be maintained (e.g., in a LUT) in attempt information 429-$g$. According to some examples, abort component 422-7 may be capable of maintaining a count of the reattempts by reattempt component 422-6 and comparing the count to the set number. For these examples, based on the counted number of attempts exceeding the set number, abort component 422-7 may be capable of preventing reattempt component 422-6 from making further attempts to initiate the emergency session.

According to some examples, apparatus 400 may also include a purge component 422-8. Purge component 422-8 may be capable of removing or causing the emergency payload stored by store component 422-5 to be removed. For example, the emergency payload may be removed from ESM or EMM context tables depending on which procedure is used to attempt or reattempt to initiate the emergency session. Removal of the emergency payload may be responsive to exceeding the set number of reattempts as determined by abort component 422-7. Removal of the emergency payload may be responsive to receiving acknowledgement 435 that indicates delivery of NOVES emergency payload 410 to the PSAP. Removal of the emergency payload may be responsive to a user of the UE including apparatus 400 manually aborting any attempts or reattempts to deliver NOVES emergency payload 410 to the PSAP. Manual aborting may be due the emergency situation no longer being an emergency or the NOVES was invoked by mistake. Removal of the emergency payload is not limited to the above examples, other examples for removal may apply.

Various components of apparatus 400 and a device implementing apparatus 400 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates an example of a logic flow 500. Logic flow 500 may be representative of some or all of the operations executed by one or more logic, features, or devices described herein, such as apparatus 400. More particularly, logic flow 500 may be implemented by payload component 422-1, attempt component 422-2, deliver component 422-3, acknowledge component 422-4, store component 422-5, reattempt component 422-6, abort component 422-7 or purge component 422-8.

In the illustrated example shown in FIG. 5, logic flow 500 at block 502 may receive an emergency payload associated with a NOVES, the emergency payload to include at least one of an emergency indicator, a voice message, a video or a text message. In some examples, payload component 422-2 of apparatus 400 (e.g., included in UE 105/305) may receive NOVES emergency payload 410 that may include or may cause payload component to add preconfigured information to the received emergency payload.

According to some examples logic flow 500 at block 504 may attempt to initiate an emergency session as part of an EMM or ESM procedure with an MME (e.g., MME 114/314), the emergency session may be initiated to deliver the emergency payload to a PSAP (e.g., PSAP 120/320.

In some examples, logic flow 500 at block 506 may store the emergency payload at a UE used by a user to invoke the NOVES responsive to a failure to initiate the emergency session. For these examples, store component 422-5 may store emergency payload information to include a timestamp to indicate a time when the NOVES was invoked in either an EMM or ESM context table as mentioned above.

According to some examples, logic flow 500 at block 508 may reattempt to initiate the emergency session to deliver the emergency payload to the PSAP. For these examples, reattempt component 422-6 may make reattempts included in emergency payload Tx attempt(s) 415. Logic flow at block 510 may abort attempts to initiate the emergency session based on a number of reattempts exceeding a set number of reattempts. Abort component 422-7 may maintain a count of reattempts and may abort reattempts by reattempt component 422-6 based on the count to reattempts exceeding a set number reattempts. Logic flow at block 512 may remove the emergency payload from the UE. Purge component 422-8 may cause the emergency payload to be removed from the UE following abort component 422-7 causing the reattempts to be aborted.

According to some examples, logic flow 500 at block 514, if the reattempts don't exceed the set number or reattempts that lead to aborting reattempts, an acknowledgement may be received. For these examples, the acknowledgement may be an acknowledgement of delivery of the emergency payload to the PSAP following a successful attempt to initiate the emergency session. Also, logic flow 500 at block 514 may remove the emergency payload from UE based on receiving the acknowledgement. For these examples, acknowledgement component 422-4 may receive the acknowledgement and purge component 422-8 may cause removal of the emergency payload responsive to receiving the acknowledgement.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
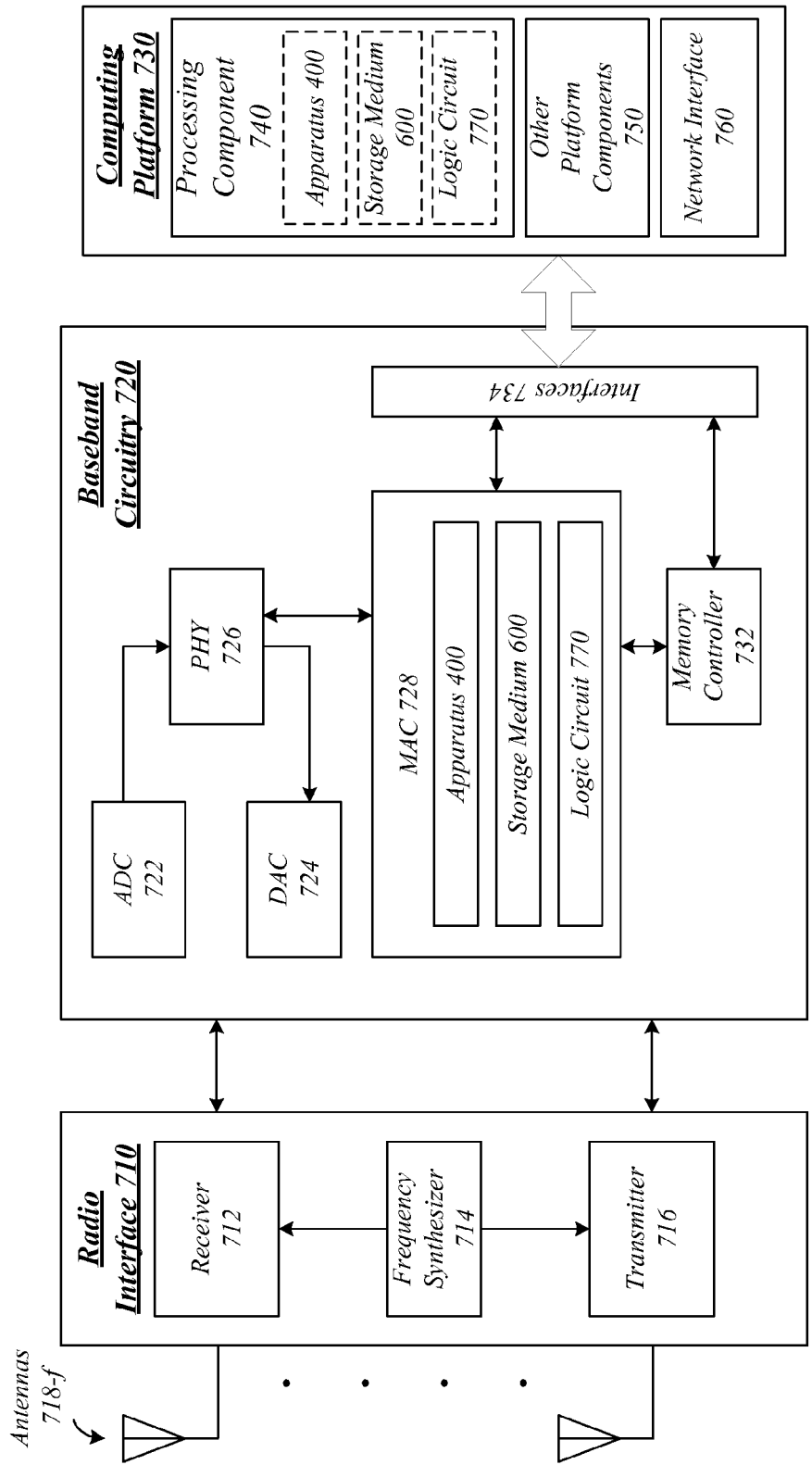
FIG. 7 illustrates an example of a device.

FIG. 7 illustrates an embodiment of a device 700 for use in a broadband wireless access network. Device 700 may implement, for example, apparatus 400, storage medium 600 and/or a logic circuit 770. The logic circuit 770 may include physical circuits to perform operations described for apparatus 400. As shown in FIG. 7, device 700 may include a radio interface 710, baseband circuitry 720, and computing platform 730, although examples are not limited to this configuration.

The device 700 may implement some or all of the structure and/or operations for the apparatus 400, storage medium 600 and/or logic circuit 770 in a single computing entity, such as entirely within a single device. Alternatively, the device 700 may distribute portions of the structure and/or operations for apparatus 400, storage medium 600 and/or logic circuit 770 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-f. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with MAC processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 728 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for apparatus 400, storage medium 600, and logic circuit 770 using the processing component 730. Processing component 740 (and/or PHY 726 and/or MAC 728) may comprise various hardware elements, software elements, or a combination of both. Examples of hardware elements may include devices, logic devices, components, processors, microprocessors, circuits, processor circuits (e.g., processor circuit 420), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to one or more 3GPP LTE or LTE-A specifications or standards. For these examples, network interface 760 may include logic and/or features to support communication interfaces described in the one or more 3GPP LTE or LTE-A specifications. For these examples, network interface 760 may enable an apparatus 400 located with a UE to communicatively couple to base station or eNB for a wireless network via a wireless communications link.

Device 700 may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
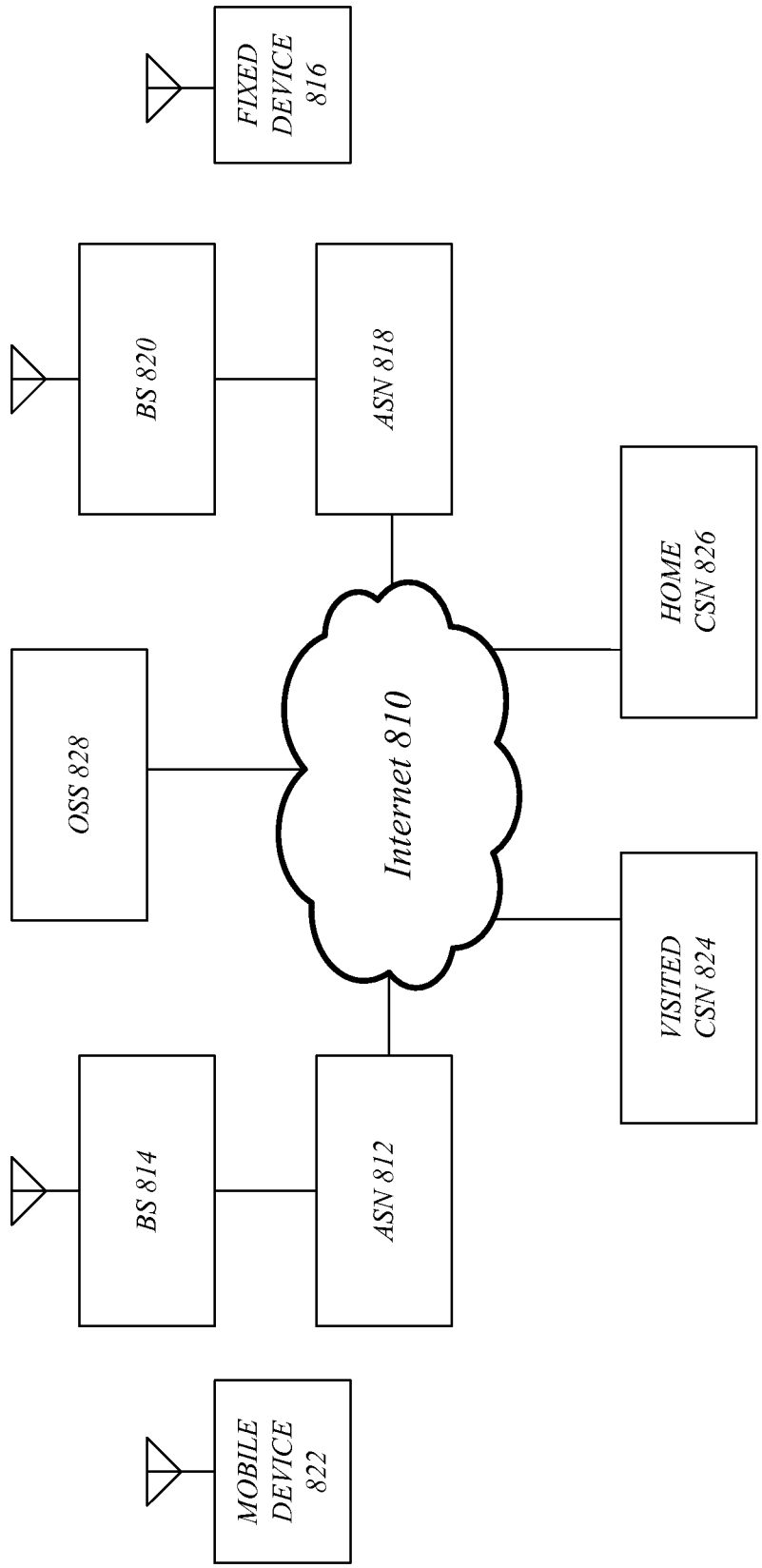
FIG. 8 illustrates an example of a broadband wireless access system.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 814, 818 are capable of coupling with base stations (BS) 814, 820 (or eNBs), respectively, to provide wireless communication between one or more fixed devices 816 and internet 810, or one or more mobile devices 822 and Internet 810. One example of a fixed device 816 and a mobile device 822 is UE 105, with the fixed device 816 comprising a stationary version of UE 105 and the mobile device 822 comprising a mobile version of UE 105. ASN 812 may implement profiles that are capable of defining the mapping of network functions to one or more physical entities on broadband wireless access system 800. Base stations 814, 820 (or eNBs) may comprise radio equipment to provide RF communication with fixed device 816 and mobile device 822, such as described with reference to device 800, and may comprise, for example, the PHY, MAC, RLC or PDCP layer equipment in compliance with a 3GPP LTE Specification or an IEEE 802.16 Standard. Base stations 814, 820 (or eNBs) may further comprise an IP backplane to couple to Internet 810 via ASN 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 824 may be referred to as a visited CSN in the case where visited CSN 824 is not part of the regular service provider of fixed device 816 or mobile device 822, for example where fixed 816 or mobile device 822 is roaming away from their respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations 814, 820, such as in or near a home or business to provide home or business customer broadband access to Internet 810 via base stations 814, 820 and ASN 812, 818, respectively, and home CSN 826. It is worthy to note that although fixed device 816 is generally disposed in a stationary location, it may be moved to different locations as needed. Mobile device 822 may be utilized at one or more locations if mobile device 822 is within range of one or both base stations 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, example first computer-implemented methods for transmitting an emergency payload may include receiving, at a UE capable of operating in compliance with one or more 3GPP LTE standards that may include LTE-A, an emergency payload associated with a NOVES. The emergency payload may include at least one of an emergency indicator, a voice message, a video or a text message. The first computer-implemented methods may also include attempting to transmit the emergency payload to a PSAP via a wireless communication network. The first computer-implemented methods may also include storing the emergency payload at the UE responsive to an unsuccessful attempt to transmit the emergency payload to the PSAP. The first computer-implemented methods may also include reattempting to transmit the emergency payload until a successful attempt to transmit the emergency payload has occurred or the NOVES has been aborted.

In some examples, the example first computer-implemented methods may also include purging the emergency payload from the UE responsive to an acknowledgement from the PSAP of receipt of the emergency payload or responsive to the NOVES being aborted.

According to some examples, the example first computer-implemented methods may also include reattempting to transmit the stored emergency payload for a configurable number of times. The NOVES may be aborted based on a number of reattempts exceeding the configurable number of times.

In some examples for the example first computer-implemented methods, the unsuccessful attempt to transmit the emergency payload to the PSAP may be caused by one of inadequate signal quality to attach to the wireless communication network, the wireless communication network is temporarily inoperable, or the wireless communication network is congested or overloaded.

According to some examples, the example first computer-implemented methods may also include storing the emergency payload with a timestamp to indicate a time when the NOVES was invoked to indicate an emergency or location information to indicate the location of the UE at the time when the NOVES was invoked.

In some examples for the example first computer-implemented methods, the emergency indicator may include a home intruder alert, a burglary in progress alert, a medical emergency, a vehicle accident, a lost person, an abduction alert or a workplace violence alert.

According to some examples for the example first computer-implemented methods, the UE may include an emergency call handling application to receive the emergency payload associated with the NOVES. For these examples, the emergency call handing application may also attempt to transmit the emergency payload to the PSAP, store the emergency payload responsive to the unsuccessful attempt, reattempt to transmit the stored emergency payload, or purge the emergency payload from the UE responsive to the acknowledgement or responsive to the NOVES being aborted.

In some examples for the example first computer-implemented methods, a NAS layer of a 3GPP protocol stack may be executed by a processor circuit of the UE. For these examples, the NAS layer may receive the emergency payload associated with the NOVES. The NAS layer may also attempt to transmit the emergency payload to the PSAP, store the emergency payload responsive to the unsuccessful attempt, reattempt to transmit the stored emergency payload, or purge the emergency payload from the UE responsive to the acknowledgement or responsive to the NOVES being aborted.

According to some examples for the example first computer-implemented methods, an RRC layer of a 3GPP protocol stack may be executed by a processor circuit of the UE. For these examples, the RRC layer may receive the emergency payload associated with the NOVES. The RRC lay may also attempt to transmit the emergency payload to the PSAP, store the emergency payload responsive to the unsuccessful attempt, reattempt to transmit the stored emergency payload, or purge the emergency payload from the UE responsive to the acknowledgement or responsive to the NOVES being aborted.

In some examples for the example first computer-implemented methods, an emergency store and forward layer of a 3GPP protocol stack may be executed by a processor circuit of the UE. For these examples, the emergency store and forward layer may receive the emergency payload associated with the NOVES. The emergency store and forward layer may also attempt to transmit the emergency payload to the PSAP, store the emergency payload responsive to the unsuccessful attempt, reattempt to transmit the stored emergency payload, or purge the emergency payload from the UE responsive to the acknowledgement or responsive to the NOVES being aborted.

According to some examples for the example first computer-implemented methods, at least one machine readable medium may include a plurality of instructions that in response to being executed on a computing device cause the computing device to carry out the example first computer-implemented method as mentioned above.

In some examples, a first apparatus to transmit an emergency payload may comprise means for performing the second computer-implemented methods as mentioned above.

According to some examples, an example second apparatus to transmit an emergency payload may include a processor circuit for a UE capable of operating in compliance with one or more 3GPP LTE standards that may include LTE-A. The example second apparatus may also include a NAS layer of a 3GPP protocol stack for execution by the processor circuit. For these examples, the NAS layer may include a payload component to receive an emergency payload associated with a NOVES. The emergency payload may include at least one of an emergency indicator, a voice message, a video or a text message. The NAS layer may also include an attempt component to attempt to initiate an emergency session as part of an EMM or ESM procedure with an MME. The emergency session may be initiated to deliver the emergency payload to a PSAP. The NAS layer may also include a store component to store the emergency payload at the UE responsive to a failure to initiate the emergency session. The NAS layer may also include a reattempt component to reattempt to initiate the emergency session to deliver the emergency payload to the PSAP. The NAS layer may also include an acknowledgement component to receive an acknowledgement of delivery of the emergency payload to the PSAP following a successful attempt to initiate the emergency session. For some examples, the emergency payload may then be removed from the UE based on receiving the acknowledgement.

In some examples for the example second apparatus, the NAS layer may also include an abort component to cause the reattempt component to abort reattempts to initiate the emergency session based on a number of reattempts exceeding a set number of reattempts. The NAS layer may also include a purge component to remove the emergency payload from the UE.

According to some examples for the example second apparatus, the store component may store the emergency payload with a timestamp to indicate a time when the NOVES was invoked to indicate an emergency or location information to indicate the location of the UE at the time when the NOVES was invoked.

In some examples for the example second apparatus, the failure to initiate the emergency session may be caused by one of inadequate signal quality to initiate the emergency session with the MME, a wireless communication network managed by the MME is temporarily inoperable or the wireless communication network managed by the MME is congested or overloaded.

According to some examples for the example second apparatus, the attempt component may attempt to initiate the emergency session as part of the EMM procedure. For these examples, the NAS layer may also include a deliver component to deliver the emergency payload via an emergency attach to the MME.

In some examples for the example second apparatus, the store component to store the emergency payload responsive to the failure to initiate the emergency session may include storing the emergency payload in an EMM context table along with a timestamp to indicate a time when the NOVES was invoked to indicate an emergency. For these examples, the deliver component may deliver the stored emergency payload with the timestamp responsive to a successful reattempt to initiate the emergency session.

According to some examples for the example second apparatus, the attempt component to attempt to initiate the emergency session as part of the ESM procedure may include a deliver component for execution by the processor circuit to deliver the emergency payload upon initiation of the emergency session via one or more uplink generic NAS transport messages routed through the MME.

In some examples for the example second apparatus, the store component to store the emergency payload responsive to the failure to initiate the emergency session may include storing the emergency payload in an ESM context table along with a timestamp to indicate a time when the NOVES was invoked to indicate an emergency. For these examples, the deliver component may deliver the stored emergency payload with the timestamp responsive to a successful reattempt to initiate the emergency session.

According to some examples for the example second apparatus, the one or more uplink generic NAS transport messages may be routed through the MME to an emergency IWF. For these examples, the emergency IWF may act as a service center for the PSAP and may translate the one or more uplink generic NAS transport messages to deliver the emergency payload to the PSAP.

In some examples for the example second apparatus, the IWF may receive an acknowledgement of delivery of the emergency payload from the PSAP and may forward the acknowledgement to the MME for the MME to use one or more downlink generic NAS transport messages to deliver the acknowledgement to the acknowledge component.

According to some examples, an example at least one machine readable medium may include a plurality of instructions that in response to being executed on an application for UE capable of operating in compliance with one or more 3GPP LTE standards that may include LET-A cause the application to receive an indication that a user of the UE has invoked a NOVES. The instructions may also cause the application to attempt to attach to a wireless network via an emergency APN to deliver an emergency payload to a PSAP. The emergency payload may include at least one of an emergency indicator, a voice message, a video or a text message. The instructions may also cause the application to store the emergency payload with a timestamp to indicate a time when the NOVES was invoked. The emergency payload may be stored responsive to an unsuccessful attempt to attach to the wireless network. The instructions may also cause the application to reattempt to attach to the wireless network a set number of times. The instructions may also cause the application to deliver the emergency payload with the timestamp responsive to a successful attachment. The instructions may also cause the application to receive an acknowledgement of delivery of the emergency payload to the PSAP and erase the stored emergency payload with the timestamp based on the acknowledgement.

In some examples for the at least one machine readable medium, the set number of times comprises a configurable number of times.

According to some examples for the at least one machine readable medium, the instructions may also cause the application to abort reattempts to attach to the wireless network based on a number of reattempts exceeding the configurable number of times.

In some examples for the at least one machine readable medium, the emergency payload may include at least one of an emergency indicator, a voice message, a video or a text message comprises a preconfigured emergency indicator, a pre-configured voice message, a pre-configured video or a pre-configured text message.

According to some examples for the at least one machine readable medium, the emergency indicator may include a home intruder alert, a burglary in progress alert, a medical emergency, a vehicle accident, a lost person, an abduction alert or a workplace violence alert.

In some examples for the at least one machine readable medium, the unsuccessful attempt to attach to the wireless network via the APN may be caused by one of an inadequate signal quality to attach to the wireless communication network, the wireless communication network is temporarily inoperable, the wireless communication network is congested or the APN is congested or temporarily overloaded.

In some examples, an example third apparatus to transmit an emergency payload for a UE capable of operating in compliance with one or more 3GPP LTE standards that may include LTE-may include means for receiving an indication that a user of the UE has invoked a NOVES. The example third apparatus may also include means for attempting to attach to a wireless network via an emergency APN to deliver an emergency payload to a PSAP. The emergency payload may include at least one of an emergency indicator, a voice message, a video or a text message. The example third apparatus may also include means for storing the emergency payload with a timestamp to indicate a time when the NOVES was invoked. The emergency payload may be stored responsive to an unsuccessful attempt to attach to the wireless network. The example third apparatus may also include means for reattempting to attach to the wireless network a set number of times. The example third apparatus may also include means for delivering the emergency payload with the timestamp responsive to a successful attachment. The example third apparatus may also include means for receiving an acknowledgement of delivery of the emergency payload to the PSAP and erase the stored emergency payload with the timestamp based on the acknowledgement.

According to some examples for the example third apparatus, the unsuccessful attempt to attach to the wireless network via the APN may be caused by one of an inadequate signal quality to attach to the wireless communication network, the wireless communication network is temporarily inoperable, the wireless communication network is congested or the APN is congested or temporarily overloaded.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, at user equipment (UE) capable of operating in compliance with one or more $3^{rd}$ Generation Partnership Project (3GPP) Long Term Evolution (LTE) standards, an emergency payload associated with a non-voice emergency service (NOVES), the emergency payload to include at least one of an emergency indicator, a voice message, a video or a text message;
attempting to transmit the emergency payload to a public service answering point (PSAP) via a wireless communication network;
storing the emergency payload at the UE responsive to an unsuccessful attempt to transmit the emergency payload to the PSAP; and
reattempting to transmit the emergency payload until a successful attempt to transmit the emergency payload has occurred or the NOVES has been aborted.

2. The computer-implemented method of claim 1, comprising purging the emergency payload from the UE responsive to an acknowledgement from the PSAP of receipt of the emergency payload or responsive to the NOVES being aborted.

3. The computer-implemented method of claim 1, comprising reattempting to transmit the stored emergency payload for a configurable number of times, the NOVES to be aborted based on a number of reattempts exceeding the configurable number of times.

4. The computer-implemented method of claim 1, comprising the unsuccessful attempt to transmit the emergency payload to the PSAP is caused by one of inadequate signal quality to attach to the wireless communication network, the wireless communication network is temporarily inoperable, or the wireless communication network is congested or overloaded.

5. The computer-implemented method of claim 1, comprising storing the emergency payload with a timestamp to indicate a time when the NOVES was invoked to indicate an emergency or location information to indicate the location of the UE at the time when the NOVES was invoked.

6. The computer-implemented method of claim 1, the emergency indicator comprises a home intruder alert, a burglary in progress alert, a medical emergency, a vehicle accident, a lost person, an abduction alert or a workplace violence alert.

7. The computer-implemented method of claim 1, comprising the UE including an emergency call handling application to receive the emergency payload associated with the NOVES, to attempt to transmit the emergency payload to the PSAP, to store the emergency payload responsive to the unsuccessful attempt, to reattempt to transmit the stored emergency payload, or to purge the emergency payload from the UE responsive to the acknowledgement or responsive to the NOVES being aborted.

8. The computer-implemented method of claim 7, comprising a non-access stratum (NAS) layer of a 3GPP protocol stack executed by a processor circuit of the UE, the NAS layer to receive the emergency payload associated with the NOVES, to attempt to transmit the emergency payload to the PSAP, to store the emergency payload responsive to the unsuccessful attempt, to reattempt to transmit the stored emergency payload, or to purge the emergency payload from the UE responsive to the acknowledgement or responsive to the NOVES being aborted.

9. The computer-implemented method of claim 1, comprising a radio resource control (RRC) layer of a 3GPP protocol stack executed by a processor circuit of the UE, the RRC layer to receive the emergency payload associated with the NOVES, to attempt to transmit the emergency payload to the PSAP, to store the emergency payload responsive to the unsuccessful attempt, to reattempt to transmit the stored emergency payload, or to purge the emergency payload from the UE responsive to the acknowledgement or responsive to the NOVES being aborted.

10. The computer-implemented method of claim 1, comprising an emergency store and forward layer of a 3GPP protocol stack executed by a processor circuit of the UE, the emergency store and forward layer to receive the emergency payload associated with the NOVES, to attempt to transmit the emergency payload to the PSAP, to store the emergency payload responsive to the unsuccessful attempt, to reattempt to transmit the stored emergency payload, or to purge the emergency payload from the UE responsive to the acknowledgement or responsive to the NOVES being aborted.

11. An apparatus comprising:
a processor circuit for user equipment (UE) capable of operating in compliance with one or more $3^{rd}$ Generation Partnership Project (3GPP) Long Term Evolution (LTE) standards; and
a non-access stratum (NAS) layer of a 3GPP protocol stack for execution by the processor circuit, the NAS layer to include;
a payload component to receive an emergency payload associated with a non-voice emergency service (NOVES), the emergency payload to include at least one of an emergency indicator, a voice message, a video or a text message;
an attempt component to attempt to initiate an emergency session as part of an evolved packet system (EPS) mobility management (EMM) or EPS session management (ESM) procedure with a mobility management entity (MME), the emergency session initiated to deliver the emergency payload to a public service answering point (PSAP);
a store component to store the emergency payload at the UE responsive to a failure to initiate the emergency session;
a reattempt component to reattempt to initiate the emergency session to deliver the emergency payload to the PSAP; and
an acknowledgement component to receive an acknowledgement of delivery of the emergency payload to the PSAP following a successful attempt to initiate the emergency session, the emergency payload removed from the UE based on receiving the acknowledgement.

12. The apparatus of claim 11, comprising the NAS layer to also include:
an abort component to cause the reattempt component to abort reattempts to initiate the emergency session based on a number of reattempts exceeding a set number of reattempts; and
a purge component to remove the emergency payload from the UE.

13. The apparatus of claim 11, the store component to store the emergency payload with a timestamp to indicate a time when the NOVES was invoked to indicate an emergency or location information to indicate the location of the UE at the time when the NOVES was invoked.

14. The apparatus of claim 11, the failure to initiate the emergency session is caused by one of inadequate signal quality to initiate the emergency session with the MME, a wireless communication network managed by the MME is temporarily inoperable or the wireless communication network managed by the MME is congested or overloaded.

15. The apparatus of claim 11, the attempt component to attempt to initiate the emergency session as part of the EMM procedure and the NAS layer to also include a deliver component to deliver the emergency payload via an emergency attach to the MME.

16. The apparatus of claim 15, the store component to store the emergency payload responsive to the failure to initiate the emergency session comprises storing the emergency payload in an EMM context table along with a timestamp to indicate a time when the NOVES was invoked to indicate an emergency, the deliver component to deliver the stored emergency payload with the timestamp responsive to a successful reattempt to initiate the emergency session.

17. The apparatus of claim 11, the attempt component to attempt to initiate the emergency session as part of the ESM procedure comprising a deliver component for execution by the processor circuit to deliver the emergency payload upon initiation of the emergency session via one or more uplink generic NAS transport messages routed through the MME.

18. The apparatus of claim 17, the store component to store the emergency payload responsive to the failure to initiate the emergency session comprises storing the emergency payload in an ESM context table along with a timestamp to indicate a time when the NOVES was invoked to indicate an emergency, the deliver component to deliver the stored emergency payload with the timestamp responsive to a successful reattempt to initiate the emergency session.

19. The apparatus of claim 17, the one or more uplink generic NAS transport messages routed through the MME to an emergency interworking function (IWF) acting as a service center for the PSAP and to translate the one or more uplink generic NAS transport messages to deliver the emergency payload to the PSAP.

20. The apparatus of claim 19, the IWF to receive an acknowledgement of delivery of the emergency payload from the PSAP and to forward the acknowledgement to the MME for the MME to use one or more downlink generic NAS transport messages to deliver the acknowledgement to the acknowledge component.

21. At least one non-transitory machine readable medium comprising a plurality of instructions that, in response to being executed at user equipment (UE) capable of operating in compliance with one or more $3^{rd}$ Generation Partnership Project (3GPP) Long Term Evolution (LTE) standards, cause the UE to:
receive an indication that a user of the UE has invoked a non-voice emergency service (NOVES);
attempt to attach to a wireless network via an emergency access point name (APN) to deliver an emergency payload to a public service answering point (PSAP), the emergency payload to include at least one of an emergency indicator, a voice message, a video or a text message;
store the emergency payload with a timestamp to indicate a time when the NOVES was invoked, the emergency payload stored responsive to an unsuccessful attempt to attach to the wireless network;
reattempt to attach to the wireless network a set number of times;
deliver the emergency payload with the timestamp responsive to a successful attachment; and
receive an acknowledgement of delivery of the emergency payload to the PSAP and erase the stored emergency payload with the timestamp based on the acknowledgement.

22. The at least one non-transitory machine readable medium of claim 21, the set number of times comprises a configurable number of times.

23. The at least one non-transitory machine readable medium of claim 22, comprising instructions that, in response to being executed at the UE, cause the UE to abort reattempts to attach to the wireless network based on a number of reattempts exceeding the configurable number of times.

24. The at least one non-transitory machine readable medium of claim 21, the emergency payload to include at least one of an emergency indicator, a voice message, a video or a text message comprises a preconfigured emergency indicator, a pre-configured voice message, a pre-configured video or a pre-configured text message.

25. The at least one non-transitory machine readable medium of claim 21, the emergency indicator comprises a home intruder alert, a burglary in progress alert, a medical emergency, a vehicle accident, a lost person, an abduction alert or a workplace violence alert.

26. The at least one non-transitory machine readable medium of claim 21, comprising the unsuccessful attempt to attach to the wireless network via the APN is caused by one of an inadequate signal quality to attach to the wireless communication network, the wireless communication network is temporarily inoperable, the wireless communication network is congested or the APN is congested or temporarily overloaded.

* * * * *